US008668188B2

(12) United States Patent
Gnateski

(10) Patent No.: US 8,668,188 B2
(45) Date of Patent: Mar. 11, 2014

(54) SLOTTED SPRING VIBRATION ISOLATOR

(75) Inventor: Viatcheslav Gnateski, Aberdeen Scotland (GB)

(73) Assignee: General Electric Company, Schenectady, NY (US)

( * ) Notice: Subject to any disclaimer, the term of this patent is extended or adjusted under 35 U.S.C. 154(b) by 119 days.

(21) Appl. No.: 12/871,964

(22) Filed: Aug. 31, 2010

(65) Prior Publication Data

US 2012/0049422 A1 Mar. 1, 2012

(51) Int. Cl.
*F16M 1/00* (2006.01)
*H01R 39/00* (2006.01)

(52) U.S. Cl.
USPC ............... 267/136; 267/140.4; 267/141.2; 439/382

(58) Field of Classification Search
USPC ............ 267/136, 152, 153, 292, 293, 140.13, 267/140.4, 141.2; 439/2, 382
See application file for complete search history.

(56) References Cited

U.S. PATENT DOCUMENTS

| | | | | |
|---|---|---|---|---|
| 4,171,920 A * | 10/1979 | Kramer et al. | ................ | 403/223 |
| 4,194,255 A * | 3/1980 | Poppe | ............................ | 267/153 |
| 4,659,069 A * | 4/1987 | Odobasic | ....................... | 267/280 |
| 5,409,199 A * | 4/1995 | Kahmann | ...................... | 267/153 |
| 5,505,270 A * | 4/1996 | Wentworth | ....................... | 173/1 |
| 6,004,298 A * | 12/1999 | Levander | ....................... | 604/211 |
| 6,716,061 B2 * | 4/2004 | Pitschi et al. | ................ | 439/578 |
| 7,290,602 B2 * | 11/2007 | Victor | ............................ | 166/105 |
| 7,784,773 B1 * | 8/2010 | Sanetick et al. | .............. | 267/205 |
| 2002/0053763 A1 * | 5/2002 | Kuwayama et al. | .......... | 267/136 |
| 2002/0140146 A1 * | 10/2002 | Nakagawa | ................ | 267/141.2 |
| 2006/0163788 A1 * | 7/2006 | Kiddle | ............................ | 267/293 |
| 2007/0085253 A1 * | 4/2007 | Franke et al. | ................ | 267/293 |

FOREIGN PATENT DOCUMENTS

| | | | | |
|---|---|---|---|---|
| EP | | 320608 A2 | * | 6/1989 |
| JP | | 06173991 A | * | 6/1994 |

* cited by examiner

*Primary Examiner* — Melody Burch
(74) *Attorney, Agent, or Firm* — Cooper Legal Group, LLC

(57) ABSTRACT

A vibration damping device adapted to receive an electronic component and reduce vibration is provided. The vibration damping device includes a spring body extending along an axis, one or more slots formed in the spring body, and a shaft extending substantially coaxially within the spring body. The shaft may include an internal bore configured to extend substantially coaxially through the spring body and shaft. The vibration damping device further includes a damping mechanism configured to be positioned between the spring body and the shaft, wherein the one or more slots provides flexible movement of the spring body and the damping mechanism provides the damping of motion within the internal bore.

13 Claims, 3 Drawing Sheets

SLOTTED SPRING VIBRATION ISOLATOR

BACKGROUND OF THE INVENTION

1. Field of the Invention

The invention relates to a vibration isolating apparatus, and more particularly, to a vibration damping device for damping vibration in electronic components.

2. Discussion of Prior Art

Many conventional vibration isolators include a vibration isolating device that uses an elastomer which acts as both a spring element and vibration damper to dampen vibrations. Specifically, at least some of these known vibration isolating devices are designed to hold an electronic component and reduce vibrations acting on the electronic component.

However, the current vibration isolating devices do not provide a bore running through the device to allow a prewired electrical harness to run through the center of the device. Moreover, current vibration isolating devices do not provide sufficient damping by merely using an elastomer to act as the spring element and vibration damper. As such, it would be useful to have a vibration damping device that holds electronic components, including prewired electrical harnesses, while providing improved vibration damping capabilities. Furthermore, it would also be useful to provide such a device that can be used in a variety of environments and temperatures, and does not require specialist servicing tools to perform maintenance on the device.

BRIEF DESCRIPTION OF THE INVENTION

The following is a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a vibration damping device adapted to receive an electronic component and reduce vibration, the device comprising a spring body extending along an axis, a plurality of slots formed in the spring body, and a shaft extending substantially coaxially within the spring body, the shaft having an internal bore configured to extend substantially coaxially through the spring body and shaft. The vibration damping device further includes a damping mechanism configured to be positioned between the spring body and the shaft, wherein the plurality of slots provides axial, radial, and rotational movement of the spring body and the damping mechanism provides the damping of motion within the internal bore.

Another aspect of the invention provides a vibration damping device adapted to receive an electronic component and reduce vibrations, the device comprising a spring body extending along an axis, a plurality of slots formed in the spring body, a shaft extending substantially coaxially within the spring body, the shaft having a first end, a second end, and an internal bore extending substantially coaxially through the spring body and shaft. The vibration damping device further includes an attachment means configured to attach the first end of the shaft to the spring body and a damping mechanism configured to be positioned adjacent the second end between an outer surface of the shaft and an inner surface of the spring body, wherein the plurality of slots provides for axial and radial movement of the spring body including compression, elongation, rotation, and the damping mechanism provides damping of motion from the spring body to the shaft.

Another aspect of the invention provides a vibration damping device adapted to receive an electronic component and reduce vibration, the device comprising a spring body extending along an axis, one or more slots formed in the spring body, a shaft extending substantially coaxially within the spring body, the shaft having a an internal bore extending substantially coaxially through the spring body and shaft, and a damping mechanism configured to be positioned along the shaft between an outer surface of the shaft and an inner surface of the spring body, wherein the one or more slots provides for axial, radial, and rotational movement of the spring body, and the damping mechanism provides damping of motion from the spring body to the shaft

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
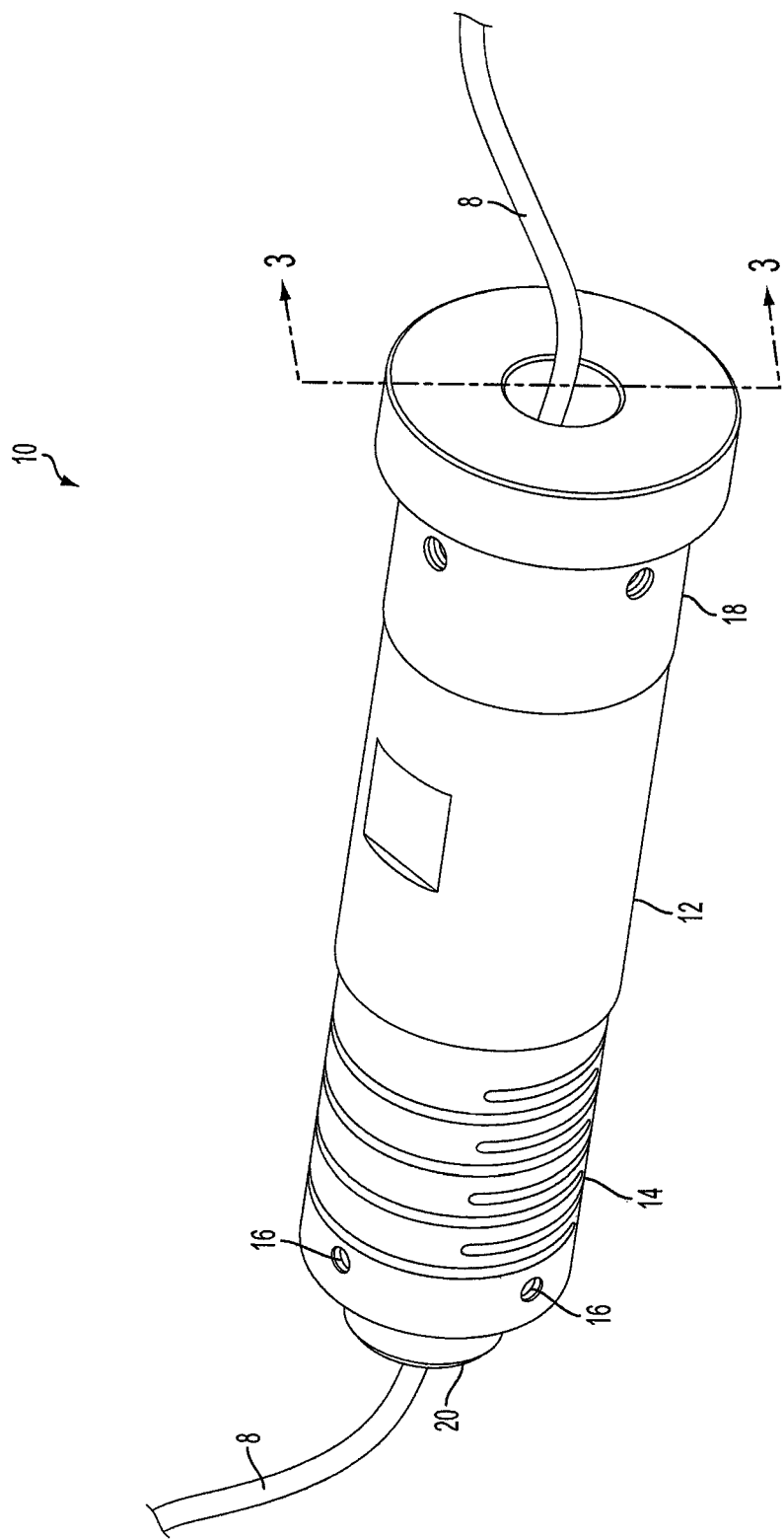
FIG. 1 is a perspective view of an example vibration damping device in accordance with one aspect of the invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example embodiment of a vibration damping device 10 can be used to minimize unwanted vibrations in electronic components. As shown in FIG. 1, the vibration damping device 10 may be adapted to receive an electronic component having a wire 8 extending from the vibration damping device 10. The vibration damping device 10 may receive and hold the electronic component, such as a wiring harness, electrical connector, one or more wires, or the like, and minimize vibrations from an external environment that act upon the electronic component.

The vibration damping device 10 may be used in a variety of environments that utilize electronic components, including oil exploration and oil exploration tools, automobiles, tools, etc. It is to be understood, however, that the vibration damping device 10 may be used in nearly any environment that experiences vibration and uses electronic components that may be affected by the vibration. The vibration damping device 10 may be designed to be inserted into a bore and held in place. In such an example, the vibration damping device 10 may include screw holes, threading, or the like (not shown) to allow it to be removably secured within the bore. Alternatively, the vibration damping device 10 may not be held in the bore and may instead hang free while holding the electronic component.

Figure 2:
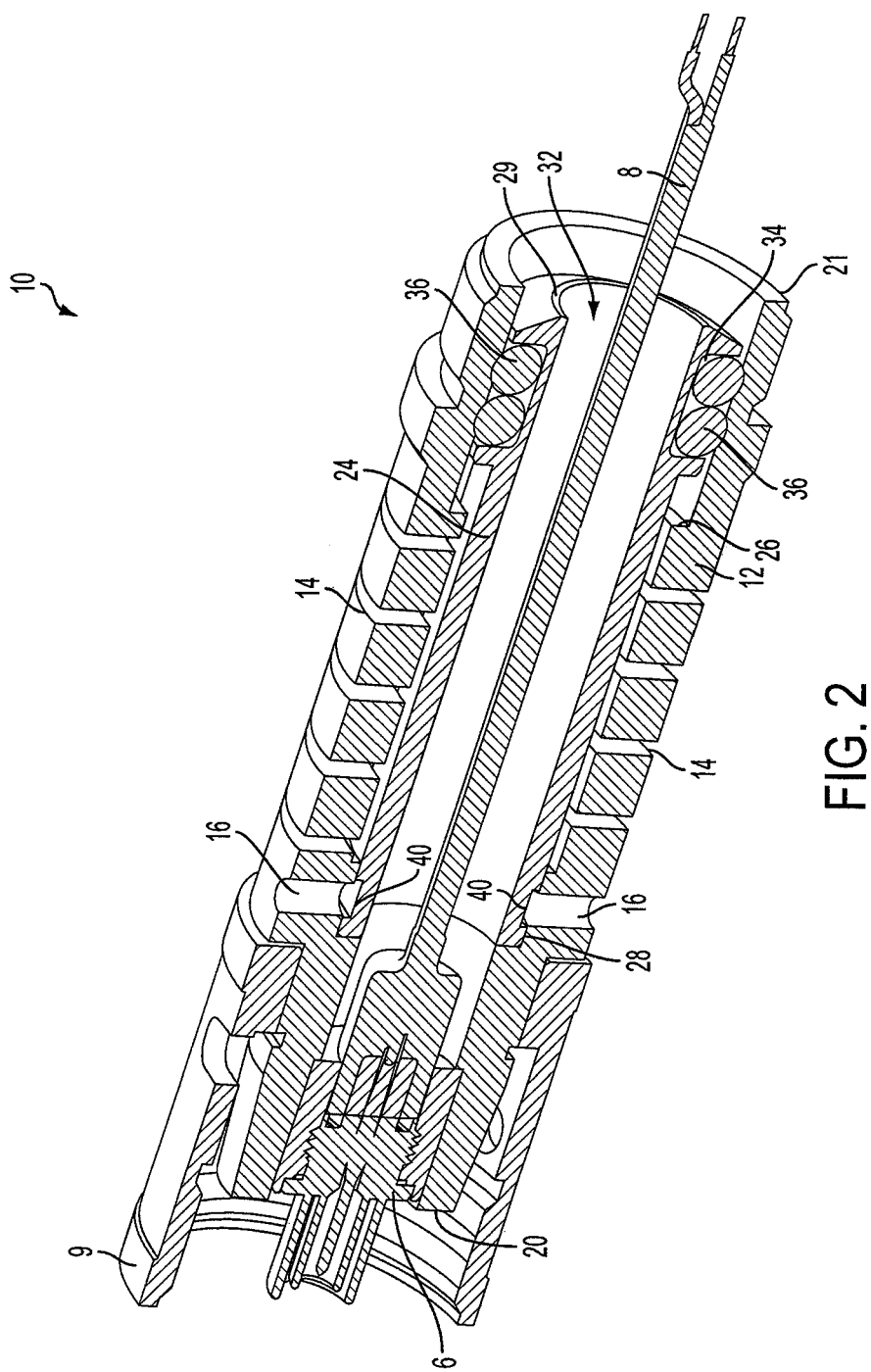
FIG. 2 is a sectional view of the vibration damping device along line 3-3 of FIG. 1 illustrating an example interior of the vibration damping device with electronic components.

FIG. 2 illustrates a sectional view of an example vibration damping device 10 with electronic components mounted within. The vibration damping device 10 may include a spring body 12, a shaft 24, and electronic components. In the shown example, the shaft 24 is mounted within the spring body 12. The electronic components may be positioned within the shaft 24 and may include a connector plug 6 and a wire 8.

It is to be understood, that a variety of electronic components may be used in the vibration damping device 10. For instance the wire 8 may include a single wire, multiple wires wrapped together or the like. Similarly, the connector plug 6 may include a variety of connectors and connector plugs, such as blade connectors, ring and spade terminals, component and device connectors, plug and socket connectors, etc. Furthermore, the electronic components may be positioned anywhere within the shaft 24. In the shown example, the connector plug 6 is shown positioned adjacent a first end 20 of the spring body 12. In other examples, however, the connector plug 6 can be positioned at an opposite end of the shaft 24, or anywhere in the middle of the shaft 24.

The connector plug 6 may be removably mounted within the spring body 12. In the shown example, the connector plug 6 includes an outer diameter that is sized to be slightly smaller than the inner diameter of the first end 20 of the spring body 12. In other examples, however, the connector plug 6 may have an attachment means for securing the connector plug 6 to the spring body 12. For instance, the outer diameter of the connector plug 6 may include a male threading while the inner diameter of the spring body 12 may include a female threading, allowing the connector plug 6 to be removably secured within the spring body 12. It is understood, however, that other attachment means may be used to secure the connector plug 6 to the shaft 24, such as an adhesive, screws, etc. Moreover, the inner diameter of the shaft 24 may include the attachment means, such that the connector plug 6 may be removably attached within the shaft 24, instead of the spring body 12.

The spring body 12 may comprise the outer housing of the vibration damping device 10. The spring body 12 may be substantially cylindrical and extend along an axis. The spring body 12 may be formed in a number of shapes, including an octagonal shape, an oval shape, a rectangular shape, etc. Similarly, the spring body 12 may be formed of more than one shape, such as having one half cylindrically shaped and the other half rectangularly shaped. Moreover, the spring body 12 may comprise a number of different materials. In one example, the spring body 12 may be formed of a metallic material, such as various types of high-strength metals including, but not limited to, stainless steel, brass, titanium, etc. In another example, the spring body 12 may be formed of a dielectric material, such as a high-strength plastic. The diameter of the spring body 12 may vary depending on the size of the electronic components to be stored. For instance, in one example, the outer diameter of the spring body 12 may be 36 millimeters, but could be larger or smaller depending on the size of the electronic components.

Figure 3:
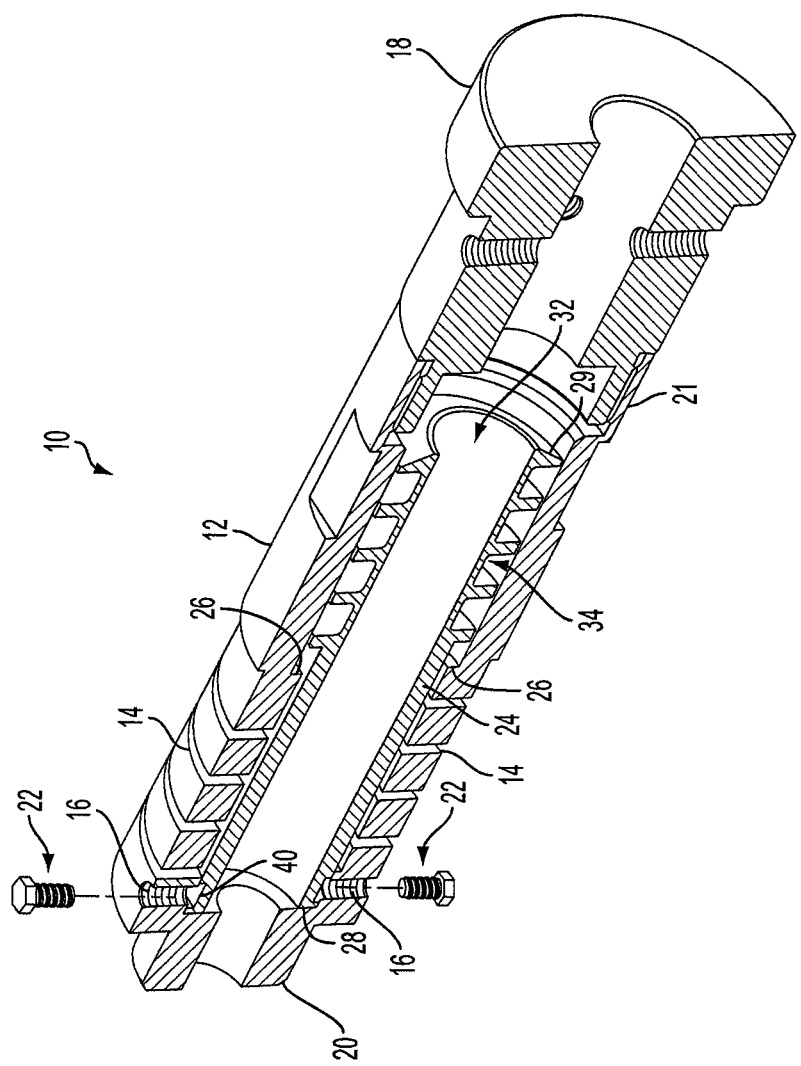
FIG. 3 is a sectional view of the vibration damping device along line 3-3 of FIG. 1, illustrating an example interior of the vibration damping device without electronic components.

The spring body 12 may include two open ends, the first end 20 and a second end 21. One or more holes 16 may be formed in the spring body 12 adjacent to the first end 20. In the shown examples, there are two holes, but it is understood that there may be more than two holes or no holes. The holes 16 may be smooth, as shown in FIG. 2, or threaded, as shown in FIG. 3. The holes 16 of FIG. 3 may be threaded so as to receive a threaded screw, or the like. As will be discussed below, the holes 16 may align with indents 40 to provide attachment between the spring body 12 and shaft 24.

The vibration damping device 10 may be adapted to mate with a first end mating part 9 (FIG. 2) and a second end mating part 18 (FIG. 3). The first end 20 of the spring body 12 may be adapted to mate with the first end mating part 9. In the shown example of FIG. 2, the first end mating part 9 may comprise a female component, such that the first end 20 of the spring body 12 is insertable into the first end mating part 9. The second end 21 of the spring body 12 may also be adapted to mate with the second end mating part 18, as shown in FIG. 3. In the shown example, the second end mating part 18 may comprise a male component, such that the second end 21 of the spring body 12 is adapted to receive the second end mating part 18. It will be appreciated that the mating parts may comprise a wide range of sizes and configurations. For instance, one or both mating parts may comprise female components, male components, or both. In another example, the first end mating part 9 may comprise a male component while the second end mating part 18 may comprise a female component. Depending on the application, the vibration damping device 10 may not include the mating parts. In such an example, the vibration damping device 10 can be inserted into a bore or may hang freely, thus not needing mating parts.

The spring body 12 may further include one or more slots 14 extending through the spring body 12. The spring body 12 may be a one-piece component with the slots machined into the body. In the shown examples, the slots 14 are positioned adjacent the first end 20 of the spring body 12. The slots 14 may, however, be positioned closer to the center or near the second end 21 of the spring body 12. The slots 14 may comprise a single continuous slot winding partially or completely around the spring body 12. In the alternative, the slots 14 may comprise a plurality of slots formed concentrically in the spring body 12 by winding partially or completely around the spring body 12. The slots 14 may be spaced a predetermined distance from each other such that the slots can be compressed or expanded to provide flexibility to the spring body 12. The number of slots and the size of the slots may be varied depending on the target flexibility in the spring body 12. For example, more slots and/or a wider slot width provides for greater compression or expansion of the slots and, thus, greater flexibility in the spring body 12. Accordingly, the number of slots may be decreased and/or the width may be narrower such that the slots 14 provide less compression or expansion and, thus, less flexibility in the spring body 12.

Referring still to FIGS. 2 and 3, the flexibility of the slots 14 may be varied depending on a number of factors, including the magnitude of vibrations, the sensitivity of the electronic components, the spring body 12 material, etc. The slots 14 may therefore provide a spring-like movement and flexibility to the spring body 12. The spring-like movement of the spring body 12 provides for flexible movement, including axial movement, such as extension and compression, radial movement, such as side to side movement, and rotational movement, such as a torsional or twisting movement. The slots 14 may be compressed and/or elongated, providing the spring body 12 with axial and radial movement. The slots 14 may also be twisted or rotated, providing the spring body with torsional rotation. The slots may further allow for lateral flexibility, such as when the spring body 12 is moved in the radial direction. Thus, as will be described below, the slots 14 allow movement in the spring body 12 to be deadened between the first end 20 and the rest of the spring body 12.

The vibration damping device 10 may further include the shaft 24 mounted within the spring body 12. The shaft 24 may be mounted substantially coaxially within the spring body 12. The shaft 24 may define an internal bore 32 extending substantially coaxially through the shaft 24 and spring body 12.

The shaft 24 may include a first end 28 and a second end 29. The ends of the shaft 24 and spring body 12 may be open, such that the internal bore 32 extends completely through. The internal bore 32 is wide enough to accommodate both the connector plug 6 and wire 8. Therefore, both the connector plug 6 and wire 8 may be partially or completely mounted within the internal bore 32. In the alternative, the connector plug 6 may be mounted in one of the ends, such as the first end 20, as shown in FIG. 2, or the second end 21, of the spring body 12.

As stated above, the shaft 24 may include one or more indents 40 formed on the outer diameter of the shaft 24. In the shown examples of FIGS. 2 and 3, the indents 40 are positioned adjacent the first end 28 of the shaft 24, but may be positioned adjacent the second end 29 of the shaft 24. The indents 40 may be rotationally aligned with the holes 16 of the spring body 12. An attachment means 22 may pass through the holes 16 and into the indents 40 such that the attachment means 22 attaches the spring body 12 to the shaft 24. In the shown example, the attachment means 22 comprises a threaded screw, however, other attachment means 22 are envisioned. For instance, the spring body 12 and shaft 24 may be attached by an adhesive, etc. Thus, the threaded screw is configured to attach the spring body 12 to the shaft 24 by being inserted into the threaded hole and into the indent 40. In the shown examples of FIGS. 2 and 3, the attachment means are positioned adjacent the first end 28 of the shaft 24. However, the attachment means may be positioned adjacent the second end 29 of the shaft 24 instead.

The shaft 24 may include one or more channels 34 formed on an outer surface of the shaft 24 adapted to hold one or more abutment members. In one example, the abutment members may include O-rings. The channels 34 may pass completely around the shaft 24. The channels 34 may comprise a number of configurations. For instance, in the shown example of FIG. 2, there is shown a single wide channel passing around the shaft 24. Alternatively, in the shown example of FIG. 3, there may be a plurality of channels formed around the shaft 24. The channels 34 may be wide enough to accommodate a damping mechanism 36. In the shown examples, the damping mechanism 36 may include the one or more abutment members, which may include circular elastomers, and, more specifically, O-rings. It is to be understood, however, that the damping mechanism 36 may include a variety of friction creating devices, such as various types of polymers.

The channels 34 may be wide enough to hold multiple O-rings, as shown in FIG. 2, or may be designed to hold a single O-ring in each channel, as shown in FIG. 3. The outer diameter of the shaft 24 may be slightly smaller than the inner diameter of the spring body 12. Consequently, O-rings may be used with a diameter large enough such that when the O-ring is placed in the channel, the O-rings may contact both the outer surface of the shaft 24 and the inner surface of the spring body 12. It is to be understood, however, that the O-rings may comprise a number of different sizes and shapes. For instance, O-rings may be used with a diameter smaller than that of the outer surface of the shaft 24, such that the O-rings may be stretched to fit onto the outer surface of the shaft 24. In the shown examples, the channels 34 and damping mechanism 36 are positioned adjacent the second end 21 of the spring body 12. Accordingly, the shaft 24 and spring body 12 may be attached to each other adjacent the first end 28 while being in damping association adjacent the second end 29.

The positioning of the channels 34 and damping mechanism 36 may comprise a number of different examples. For instance, in one example, the channels 34 and damping mechanism 36 may be positioned adjacent the second end 29 of the shaft 24 while the shaft 24 and spring body 12 are attached to each other adjacent the first end 28. In another example, the channels 34 and damping mechanism 36 may extend from one end of the shaft 24 to the center of the shaft 24 or past the center of the shaft 24, such that the channels 34 and damping mechanism 36 extend along more than half of the length of the shaft 24. In the shown examples, however, the channels 34 and damping mechanism 36 extend along less than half of the length of the shaft 24.

The spring body 12 may include a lip 26 positioned on the inner diameter of the spring body 12. The lip 26 may be formed integrally in the spring body 12 or may be separately manufactured and/or positioned in the inner diameter of the spring body 12, such as by a ring or an attachment device designed to fit within the inner diameter of the spring body 12. The lip 26 may project inwardly and is configured to engage with the shaft, specifically an end portion of the channels 34. The lip 26 may pass partially or completely around the inner diameter of the spring body 12. Thus, the lip 26 may provide for a limit to the axial movement between the spring body 12 and the shaft 24. For instance, when vibrational movement causes the slots 14 to elongate, the spring body 12 is lengthened with respect to the shaft 24. The shaft 24 remains still due to the attachment means 22 attaching the shaft 24 to the spring body 12. When the slots 14 have elongated a certain distance, the lip 26 may contact the channels 34 and prevent any further elongation. Thus, the lip 26 may provide a maximum elongation of the spring body 12 with respect to the shaft 24. Though not shown, further examples may include a second lip positioned on an opposite side of the channels 34 opposite to the first lip. In such an example, the lip 26 will provide a maximum elongation of the spring body 12 while the second lip will provide a maximum compression of the spring body 12.

The combination of the slots 14 and damping mechanism 36 in the vibration damping device 10 may reduce unwanted vibrations from propagating through to the electronic components. Specifically, the vibration damping device 10 may slow down and reduce the magnitude of vibratory motions acting on the connector plug 6 and wire 8. When a force acts on the vibration damping device 10 causing axial movement, the slots 14 may elongate or compress with respect to the shaft 24. The further the slots 14 are compressed or elongated, the more force is needed to cause additional compression or elongation. As the spring body 12 is shortened or lengthened, the slots 14 are compressed or elongated, respectively, and the shaft 24 remains relatively still with respect to the spring body 12. As a result, the slots 14 absorb vibrational forces that would otherwise have acted on the connector plug 6 and wire 8. Furthermore, radial, side to side movement causes the O-rings to compress and partially absorb vibrational forces. Movement of the shaft 24 with respect to the spring body 12 is reduced by the compression of the O-rings. As a result, radial, side to side movement is reduced with respect to the shaft 24, and, as such, with respect to the electronic components as well.

The spring body 12, shaft 24, and O-rings may be easily replaced, allowing for prolonged existence of the vibration damping device 10. Similarly, the modular design allows a user to service the components of the vibration damping device 10 without the use of specially made tools, as the first end mating part 9 may be removed from the spring body 12 by hand. Similarly, the small size of the vibration damping device 10 provides for ease of storage and transportation. The spring body 12 and shaft 24 may comprise metal, such as stainless steel, ensuring durability and longevity. Depending on the materials used in the spring body 12 and shaft 24, temperature effects, such as thermal expansion, on the vibration damping device 10 may be marginal, allowing the vibration damping device 10 to be used in a variety of environments, ranging from extreme hot to extreme cold. Lastly, the vibration damping device 10 requires no calibration.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A vibration damping device adapted to receive an electronic component and reduce vibration, the device comprising:
   a spring body extending along an axis and having a first axial end and a second axial end, with reference to the axis, the spring body being hollow along an entire extent of the spring body along the axis and having radially, relative to the axis, inner and outer boundaries;
   one or more slots formed in the spring body located intermediate the first and second axial ends of the spring body, the one or more slots extending radially, relative to the axis, through the spring body from the radially inner boundary of the spring body to the radially outer boundary of the spring body;
   a shaft extending substantially coaxially within the spring body, the shaft having a first axial end, a second axial end, and an internal bore extending along the axis such that the bore extends along the entire extent of the shaft along the axis and configured to extend substantially coaxially through the spring body and shaft, the shaft having a portion that is radially, relative to the axis, adjacent and opposed to the one or more slots in the spring body and spaced radially, relative to the axis, away from the spring body at the one or more slots; and
   a damping mechanism configured to be positioned between the spring body and the shaft, wherein the one or more slots provides axial, radial, and rotational movement of the spring body and the damping mechanism provides the damping of motion within the internal bore;
   wherein the damping mechanism comprises a plurality of O-rings, which are distinct from the spring body, the shaft includes at least one channel formed in an outer surface and extending annularly, relative to the axis, about the shaft, and the at least one channel is configured to hold one or more O-rings, the at least one channel and the O-rings being located adjacent to the second axial end of the spring body.

2. The vibration damping device of claim 1, wherein the one or more slots provide a flexible movement of the spring body.

3. The vibration damping device of claim 1, wherein the spring body includes at least one threaded hole extending transverse to the coaxial extent of the shaft and the spring body, and located adjacent to the first axial end of the shaft, and the device including at least one threaded screw extending transverse, with respect to the axis, in the at least one threaded hole to fixedly attach the spring body to the shaft at the first axial end of the shaft.

4. The vibration damping device of claim 3, wherein the shaft includes one or more indents at the first axial end of the shaft and extending transverse to the coaxial extent of the shaft and the spring body and, rotationally and axially aligned with the at least one threaded hole to receive the at least one threaded screw.

5. A vibration damping device adapted to receive an electronic component and reduce vibration, the device comprising:
   a spring body extending along an axis and having first and second axial ends, with reference to the axis, the spring body being hollow along an entire extent of the spring body along the axis and having radially, relative to the axis, inner and outer boundaries, and constructed of non-elastomeric material;
   one or more slots formed in the spring body, the one or more slots extending radially, relative to the axis, through the spring body from the radially inner boundary of the spring body to the radially outer boundary of the spring body;
   a shaft extending substantially coaxially within the spring body, the shaft having a first axial end, a second axial end, and an internal bore extending along the axis such that the bore extends along the entire extent of the shaft along the axis and extending substantially coaxially through the spring body and the shaft;
   an attachment means configured to attach the first axial end of the shaft to the spring body adjacent to the first axial end of the spring body so that the second axial end of the shaft is not attached to the spring body; and
   a damping mechanism configured to be positioned adjacent the second axial end of the shaft between an outer surface of the shaft and an inner surface of the spring body, wherein the one or more slots provides for flexible movement of the spring body, including compression, elongation, rotation, and the damping mechanism provides damping of motion from the spring body to the shaft.

6. The vibration damping device of claim 5, wherein the damping mechanism comprises a plurality of O-rings.

7. The vibration damping device of claim 5, wherein the shaft includes at least one channel formed in the outer surface of the shaft.

8. The vibration damping device of claim 7, wherein the at least one channel is configured to hold one or more O-rings.

9. The vibration damping device of claim 5, wherein the one or more slots provide the flexible movement of the spring body.

10. The vibration damping device of claim 5, wherein the spring body includes at least one threaded hole extending transverse to the coaxial extent of the shaft and the spring body, and located adjacent to the first axial end of the shaft, and the device including at least one threaded screw extending transverse, with respect to the axis, in the at least one threaded hole to fixedly attach the spring body to the shaft at the first axial end of the shaft.

11. The vibration damping device of claim 10, wherein the shaft includes one or more indents at the first axial end of the shaft and extending transverse to the coaxial extent of the shaft and the spring body and, rotationally and axially aligned with the at least one threaded hole to receive the at least one threaded screw.

12. A vibration damping device adapted to receive an electronic component and reduce vibration, the device comprising:
   a spring body, extending along an axis and having a first axial end and a second axial end, with reference to the axis, providing a radially, with reference to the axis, outer housing of the vibration damping device, the spring body being hollow along an entire extent of the spring body along the axis and having radially, relative to the axis, inner and outer boundaries;

one or more slots formed in the spring body, the one or more slots extending radially, relative to the axis, through the spring body from the radially inner boundary of the spring body to the radially outer boundary of the spring body;

a shaft extending substantially coaxially within the spring body, the shaft having a first axial end, a second axial end, and an internal bore extending along the axis such that the bore extends along the entire extent of the shaft along the axis and configured to extend substantially coaxially through the spring body and shaft; and a damping mechanism configured to be positioned along the shaft between an outer surface of the shaft and an inner surface of the spring body, wherein the one or more slots provides for axial, radial, and rotational movement of the spring body, and the damping mechanism provides damping of motion from the spring body to the shaft, the slots are transverse to the axial extent of the spring body and opening to the radial, with reference to the axis, exterior of the radially outer housing of the vibration damping device provided by the spring body, the slots extend in a radial, with reference to the axis, arc about the spring body and the slots open to a radial, with reference to the axis, exterior of the vibration damping device;

wherein the shaft includes at least one channel formed in an outer surface.

13. The vibration damping device of claim 12, wherein the at least one channel is configured to hold one or more O-rings.

* * * * *